United States Patent
Wyers

(10) Patent No.: US 7,121,121 B2
(45) Date of Patent: Oct. 17, 2006

(54) LOCKING DEVICE FOR TRAILER HITCHES AND METHOD THEREFOR

(76) Inventor: Philip W. Wyers, 14705 E. Arberdeen Ave., Centennial, CO (US) 80016

( * ) Notice: Subject to any disclaimer, the term of this patent is extended or adjusted under 35 U.S.C. 154(b) by 0 days.

(21) Appl. No.: 10/451,928

(22) PCT Filed: Feb. 27, 2003

(86) PCT No.: PCT/US03/06274

§ 371 (c)(1),
(2), (4) Date: Jun. 24, 2003

(87) PCT Pub. No.: WO03/078183

PCT Pub. Date: Sep. 25, 2003

(65) Prior Publication Data

US 2004/0134242 A1    Jul. 15, 2004

Related U.S. Application Data

(60) Provisional application No. 60/363,999, filed on Mar. 13, 2002.

(51) Int. Cl.
*B60R 25/00*    (2006.01)

(52) U.S. Cl. ............... 70/14; 70/18; 70/38 A; 70/39; 70/258; 280/507

(58) Field of Classification Search ............ 70/14, 70/18, 19, 38 A, 39, 58, 258, 232, 237, 234, 70/235; 280/507, 511, 513; 248/551–553
See application file for complete search history.

(56) References Cited

U.S. PATENT DOCUMENTS

| | | | |
|---|---|---|---|
| 1,543,397 A * | 6/1925 | Schroeder ............... 70/39 |
| 2,571,349 A | 10/1951 | Eckles | |
| 3,884,055 A | 5/1975 | Vuillemot ............... 70/58 |
| 3,924,878 A * | 12/1975 | Utman et al. ............... 280/507 |
| 4,032,171 A | 6/1977 | Allen et al. ............... 280/507 |
| 4,141,569 A | 2/1979 | Dilk ............... 280/507 |
| 4,480,450 A * | 11/1984 | Brown ............... 70/14 |
| 4,741,454 A * | 5/1988 | Ray et al. ............... 220/315 |
| 4,836,570 A * | 6/1989 | Lopez et al. ............... 280/507 |
| 5,094,423 A * | 3/1992 | Almquist et al. ............... 248/552 |
| 5,219,435 A * | 6/1993 | Sprunger ............... 280/511 |
| 5,433,468 A | 7/1995 | Dixon ............... 280/507 |
| 5,823,021 A * | 10/1998 | Chang ............... 70/38 A |

(Continued)

OTHER PUBLICATIONS

Letter from Robert H. Harp, III on behalf of Cequent Trailer Products, Inc., dated Sep. 17, 2004.

(Continued)

*Primary Examiner*—Lloyd A. Gall
(74) *Attorney, Agent, or Firm*—Timothy J. Martin; Michael R. Henson; John W. Carpenter

(57) ABSTRACT

A method and apparatus to secure the coupler section of a trailer provides a locking device that includes a lock housing having a hitch ball element to engage the recess in the coupler, a shackle member lockable to the housing and having a bridge section that spans the hitch ball element, and a latch assembly to latch and unlatch the shackle member. The shackle member is shown to be U-shaped with legs that extend through and secure to the lock housing. The latch assembly provides a ratchet-type engagement to allow adjustable locking. A rotatable lock mechanism drives a cam based latch mechanism between a latch state and an unlatch state.

18 Claims, 5 Drawing Sheets

U.S. PATENT DOCUMENTS

| | | | |
|---|---|---|---|
| 5,839,302 A * | 11/1998 | Chu | 70/38 A |
| 5,873,271 A * | 2/1999 | Smith | 70/58 |
| 6,155,589 A * | 12/2000 | Simpson | 280/507 |
| 6,378,343 B1 * | 4/2002 | Lee | 70/209 |
| 6,406,052 B1 * | 6/2002 | Bale | 280/507 |
| 6,412,313 B1 * | 7/2002 | Bernstrom | 70/14 |
| 6,412,314 B1 * | 7/2002 | Jenks | 70/14 |
| 6,666,051 B1 * | 12/2003 | Li | 70/14 |
| 6,694,781 B1 * | 2/2004 | Li | 70/14 |
| 6,698,256 B1 * | 3/2004 | Witchey | 70/14 |
| 6,722,686 B1 * | 4/2004 | Koy | 280/507 |
| 2005/0039498 A1 * | 2/2005 | Budge | 70/14 |

OTHER PUBLICATIONS

Product board insert: UTL100, Fulton, Performance Products, Inc. of Mosinee, WI 54455.

Catalog: Fulton Performance Products; Trailer Products, Fulton Performance Products, Inc., Mosinee, WI 54455.

* cited by examiner

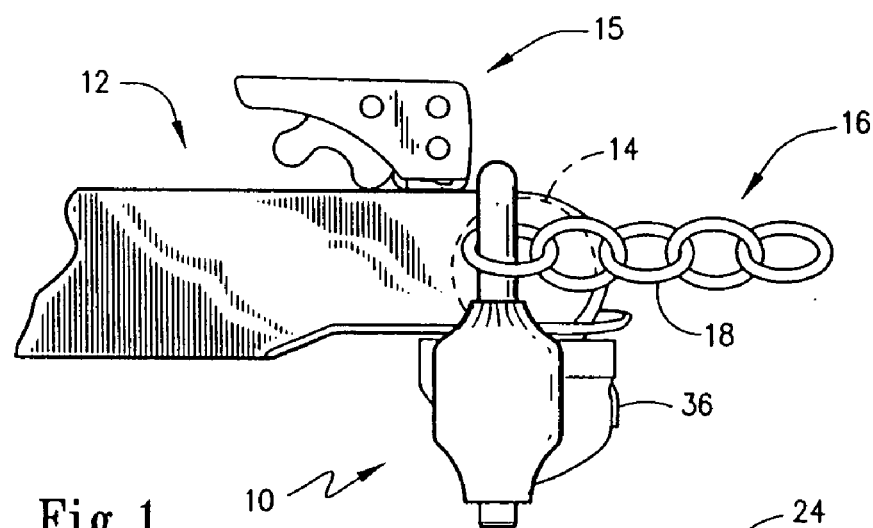
Fig.1
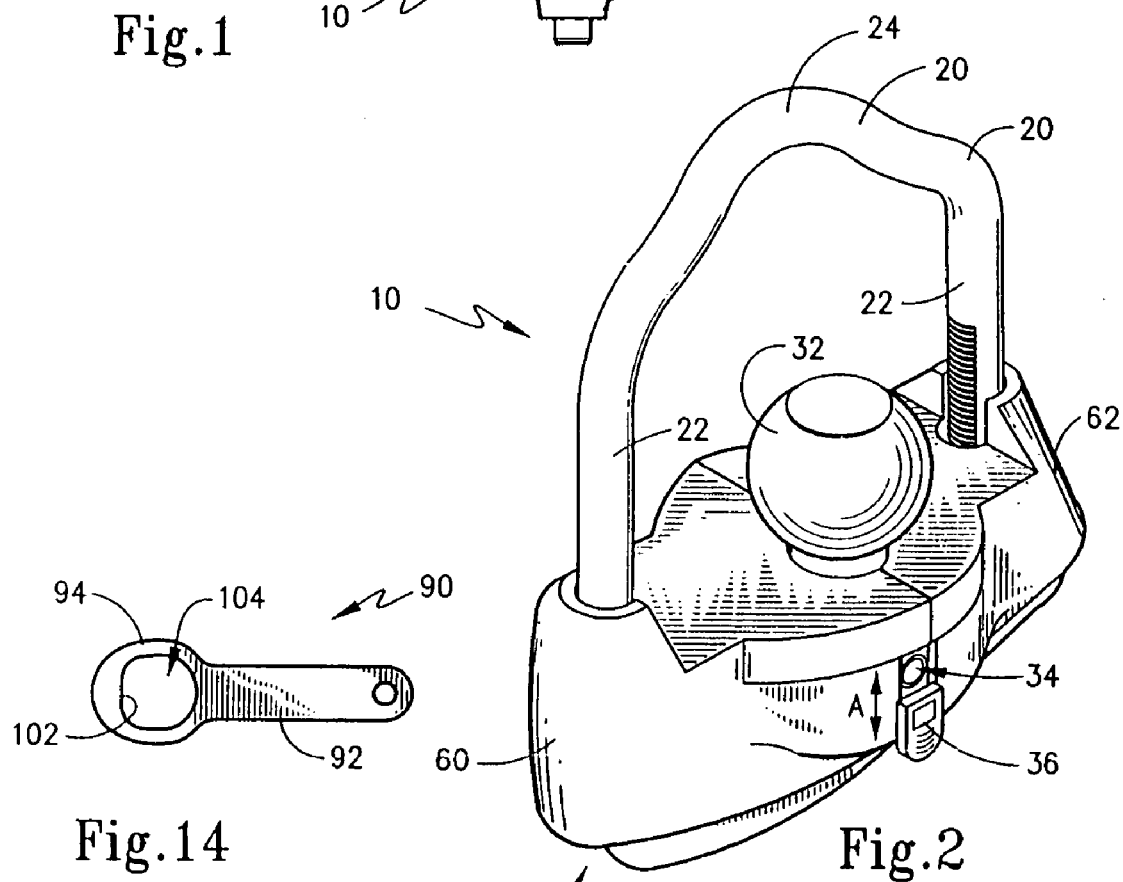
Fig.2
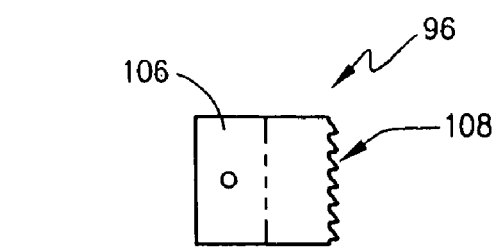
Fig.14
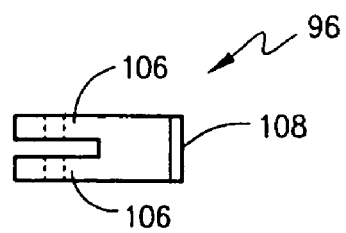
Fig.15
Fig.16

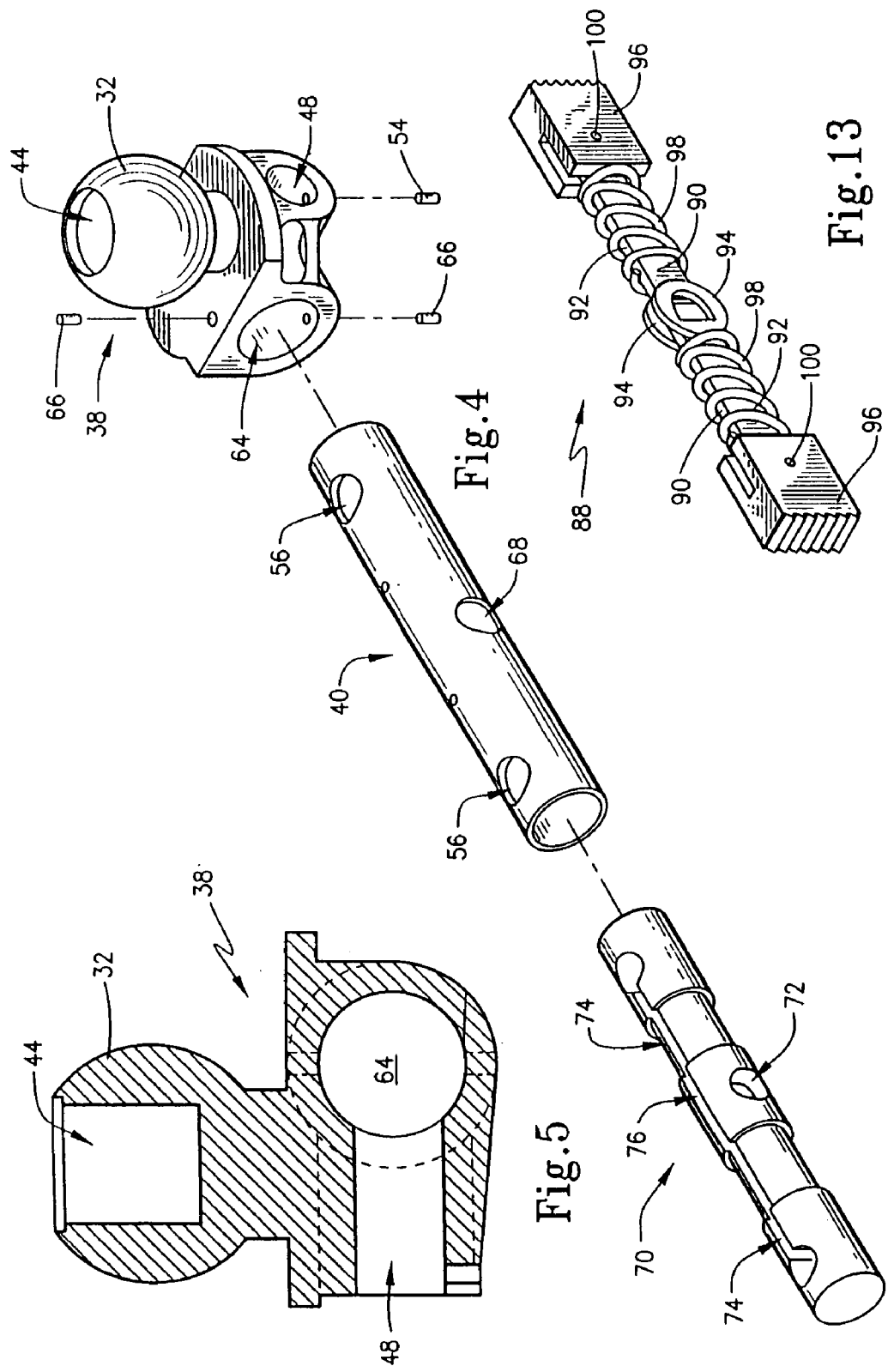

LOCKING DEVICE FOR TRAILER HITCHES AND METHOD THEREFOR

CROSS REFERENCE TO RELATED APPLICATIONS

This application claims the benefit of U.S. Provisional Application No. 60/363,999 filed Mar. 13, 2002.

FIELD OF THE INVENTION

The present invention broadly concerns locking devices operative to prevent unauthorized access, theft or unauthorized use of objects. More particularly, however, the present invention is directed to a locking device to prevent the theft or unauthorized use of a trailer. The present invention specifically concerns a locking device which mates with the hitch recess in a trailer coupler so as to preclude access to that hitch and to secure the trailer to a stationary, relatively immoveable object.

BACKGROUND OF THE INVENTION

The use of towable vehicles has become increasingly popular for both utilitarian and pleasure purposes. A wide variety of both tractor and trailer vehicles are employed for general or special purposes. Tractor vehicles, for example, include both those that travel on road, such as cars, sport utility vehicles, trucks, semi-tractors and a wide variety of farm and agricultural tractor equipment. Trailer vehicles, on the other hand, include utility trailers, commercial trailers, recreational vehicle trailers, boat trailers, camping trailers, to name a few.

One of the most common structures used to link a tractor vehicle to a trailer vehicle is the hitch ball and trailer coupler. Here, a mounting structure is provided on the tractor vehicle, and the mounting structure supports a generally spherical hitch ball in an upright manner. The trailer vehicle then includes a tongue associated with the frame of the trailer vehicle with this tongue having a forwardly extending hitch ball coupler that includes a recess that mateably receives the hitch ball and that can be secured thereto during the towing operation. During the towing operation, the hitch ball and the trailer hitch coupler are latched together to prevent inadvertent disengagement. In addition, it is known to provide the latch mechanisms of the trailer hitch coupler with a locking device so that the trailer can be locked onto the hitch ball.

However, when a trailer vehicle is disconnected from the towing vehicle, it may become the target of unauthorized use or theft. In such cases, a thief or other user may merely attach another towing vehicle to the trailer hitch coupler and drives away with the trailer vehicle. In order to deter theft, it is known to lock the trailer hitch coupler latch in an unlatched condition so that it may not be secured in a normal manner to another tractor vehicle. However, the recess of the trailer hitch coupler is still available for mating with a hitch ball of a thief's tractor vehicle.

Accordingly, it is also known to provide a locking structure that engages the hitch ball recess of a trailer hitch coupler and locks onto the trailer hitch coupler so that the locking device interferes with the ability to attach a tractor vehicle. For example, U.S. Pat. No. 5,433,468 issued Jul. 8, 1995 to Dickson discloses a theft resistant device wherein a cylindrical member may be inserted into the recess of a trailer hitch coupler. A pair of arms are pivotally secured to this cylindrical member, on either side thereof, so that they may pivot across the top of the trailer hitch coupler and be secured by a lock shackle that may pass through openings in the free ends of the arms. This device, however, can be subject to attack by a thief and removed simply by hammering the arms out of alignment or breaking the arms off of the device so that the cylinder, and thus the locking device, may be removed from the trailer hitch coupler.

In U.S. Pat. No. 4,141,569, issued Feb. 27, 1979 to Dilk, another theft prevention device for use on a detached trailer vehicle is disclosed. Here, a hitch ball structure is mounted in a box-like housing that has a hinged lid. The hitch ball structure is positioned in the recess of a trailer hitch coupler, and the lid is then pivoted into place so as to trap the hitch coupler between the hitch ball structure and a downwardly depending post that is mounted to the lid. The lid may then be padlocked into a closed position. U.S. Pat. No. 4,032,171, issued Jun. 28, 1977 to Allen et al., teaches a somewhat similar technique of locking a trailer hitch coupler. Each of these devices are relatively bulky and complex and again are subject to attack by a thief due to the exposed parts.

U.S. Pat. No. 3,884,055, issued May 20, 1975 to Vuillemot also locks into the recess of a trailer hitch coupler. Here, a cylindrical post is mounted to a U-shaped bracket with the post sized to be received in the recess. The legs of the bracket are provided with openings through which a bar that extends across the trailer hitch coupler and the post with this bar being locked in the bracket by means of a padlock. While this device is rather compact, it still exposes the locking structure to attack by a thief.

While the above-referenced devices do, in fact, lock onto a trailer hitch coupler, they suffer other disadvantages in addition to those noted above. For example, none of the devices disclosed in the above-referenced patents are readily adjustable for differently dimensioned trailer hitch couplers moreover, each relies on an independent padlock which can inadvertently be misplaced so that the locking structure becomes less useable until another padlock is obtained.

Accordingly, there remains a need for improved locks which may lock onto a trailer hitch coupler in order to discourage theft of a trailer vehicle when it is detached from a towing vehicle. There is a need for a device which is both compact, strong and durable such that the device resists attack by a would-be thief. There is further a need for such a locking device that has a locking mechanism incorporated therein so as to avoid the requirement of an auxiliary padlock.

SUMMARY OF THE INVENTION

It is an object of the present invention to provide a new and useful locking device and method to secure to a coupler section of the trailer.

Another object of the present invention is to provide a locking device for a trailer hitch coupler that is robust in construction.

It is another object of the present invention to provide a locking device for a trailer hitch coupler that is adjustable to accommodate different sizes and configuration of such trailer hitch couplers.

A further object of the present invention is to provide a locking device for a trailer hitch coupler that is configured so as to resist physical attack sufficient to remove the device from the trailer hitch coupler to which it is secured.

Still a further object of the present invention is to provide a locking device for a trailer hitch coupler which has a locking mechanism integrally associated therewith.

According to the present invention, then, a locking device is adapted to secure to a coupler section of a trailer wherein the coupler section has a hitch ball recess. Broadly, the locking device includes a lock housing that has a hitch ball element supported thereby that is sized and adapted to be engaged with and disengaged from the hitch ball recess of a coupler section of a trailer. A shackle member is releaseably securable to the lock housing to define a retained state. The shackle member includes a bridge section that extends across the hitch ball when in the retained state whereby the coupler section becomes non removably trapped between the hitch ball element and the bridge section when in the retained state. The shackle member is releasable from the lock housing to define a release state wherein the coupler section can be released from the hitch ball element. A selectively lockable latch assembly is disposed in the lock housing and is operative to move between latched state wherein the shackle member is latched in the retained state and an unlatched state when shackle member may be moved to the released state.

While the shackle member may include a single leg section supporting the bridge section, the exemplary embodiment discloses a shackle member that is generally U-shaped in configuration including a pair of spaced apart leg sections and a bridge section extending therebetween. In any event, either the single leg section or the pair of legs sections are securable to the lock housing when in the retained state with the bridge section being oriented across the hitch ball element. Moreover, a latch structure is located on each leg section, and the lock housing includes one or more passageways formed therein which are sized to receive a respective leg section when in the retained state. The latch assembly is operative to engage the latch structure on the leg section when in the latch state to prevent removal of the leg section from the lock housing. The latch structure may be defined by a plurality of first latch teeth, and the latch mechanism includes a latch block having at least one latch tooth, but in the exemplary embodiment, a plurality of latched teeth are disclosed, that are operative to engage the first latch teeth when in the retained state. The latch block is biased toward the retained state so as to define a ratchet engagement whereby the leg section(s) may be inserted into but not removed from the lock housing when the latch mechanism is in the latched state.

In the exemplary embodiment, the latch assembly includes a latch mechanism and a lock mechanism that are mechanically linked to one another. The lock mechanism is rotatable between first and second rotational positions thereby to move the latch mechanism between the latched and unlatched states and includes a cam post. A limit stop structure is provided to control the magnitude of rotation. Here, the latch mechanism may include a latch rod having a cam surface associated therewith and moveable between first and second rod positions that respectively correspond to the latched and unlatched states. The lock mechanism then includes a cam element that interacts with the cam surface so that rotation of the lock mechanism between the first and second rotational positions acts to cause movement of the latch rob between the first and second rod position. In the exemplary embodiment, two such latch rods are provided, and each latch rod includes a shaft portion and a head portion located at a first end. The head portion has a lop-sided opening that forms the cam surface. A latch block is then located at the second end of the shaft portion opposite the first end. The head portion has the cam surface formed therein and a spring is positioned along the shaft portion to bias each of the latch rods towards the first rod position.

Again, in the exemplary embodiment, the lock housing includes a body portion that has a longitudinal throughway extending therethrough and a transverse bore intersecting the throughway. The hitch ball is oriented generally orthogonally to the throughway and to the bore. An elongated tubular casing is disposed in the throughway. The latch mechanism is then disposed in the casing and the lock mechanism is disposed in the bore. The casing includes at least one exposed portion that projects exteriorly of the body portion and as a passageway formed therein sized to received the leg section when in the retained state. The latch assembly then operated to engage the latch structure to prevent removal of the leg section from the casing. Where the shackle member has two leg sections, the casing includes oppositely projecting exposed portions each with a passageway formed therein.

The present invention is also directed to a method of securing the coupler section of the trailer that has a hitch ball recess. Here, the broad method includes the step of engaging a hitch ball recess with a hitch ball element. Next, a portion of the coupler section adjacent to the hitch ball element is spanned with a first portion of the shackle member in such manner that a portion of the coupler members is positioned between the first portion of the shackle member and the hitch ball element. The first portion of the shackle member is then adjusted to trap the portion of the coupler member in a nonremoveable manner between the hitch ball element and the first portion of the shackle member to define the locked state. The second portion of the shackle member is then lockably retained relative to the hitch ball element such that the first portion of the shackle member is locked in the lock state. The broad method may also include the step of selectively releasing the second portion of the shackle member such that the first portion of the shackle member is unlocked and removeable thereby permitting disengagement with the portion of the coupler section. The step of adjusting the first portion of the shackle member may be accomplished by a ratchet mechanism. Other method steps inherent in the above described structure are contemplated within this method.

These and other objects of the present invention will become more readily appreciated and understood from a consideration of the following detailed description of the exemplary embodiment of the present invention when taken together with the accompanying drawings, in which:

BRIEF DESCRIPTION OF THE DRAWINGS

FIG. 1 is a side view in elevation showing the locking device according to the present invention secured to the coupler section of a trailer in a retained state;

FIG. 2 is a perspective view of the locking device shown in FIG. 1;

FIG. 4 is an exploded view in perspective showing a portion of the latch mechanism of the locking device according to the exemplary embodiment of the present invention;

FIG. 5 is a side view in cross-section showing the body portion of the lock housing illustrated in FIG. 4;

FIG. 13 is a perspective view showing the latch rod and block structure of the latch mechanism according to the present invention;

FIG. 14 is a front view in elevation of a latch rod shown in FIG. 13;

FIG. 15 is a front view in elevation of a latch lock illustrated in FIG. 13;

FIG. 16 is top plan view of the latch block shown in FIG. 15;

DETAILED DESCRIPTION OF THE EXEMPLARY EMBODIMENTS

Figure 3:
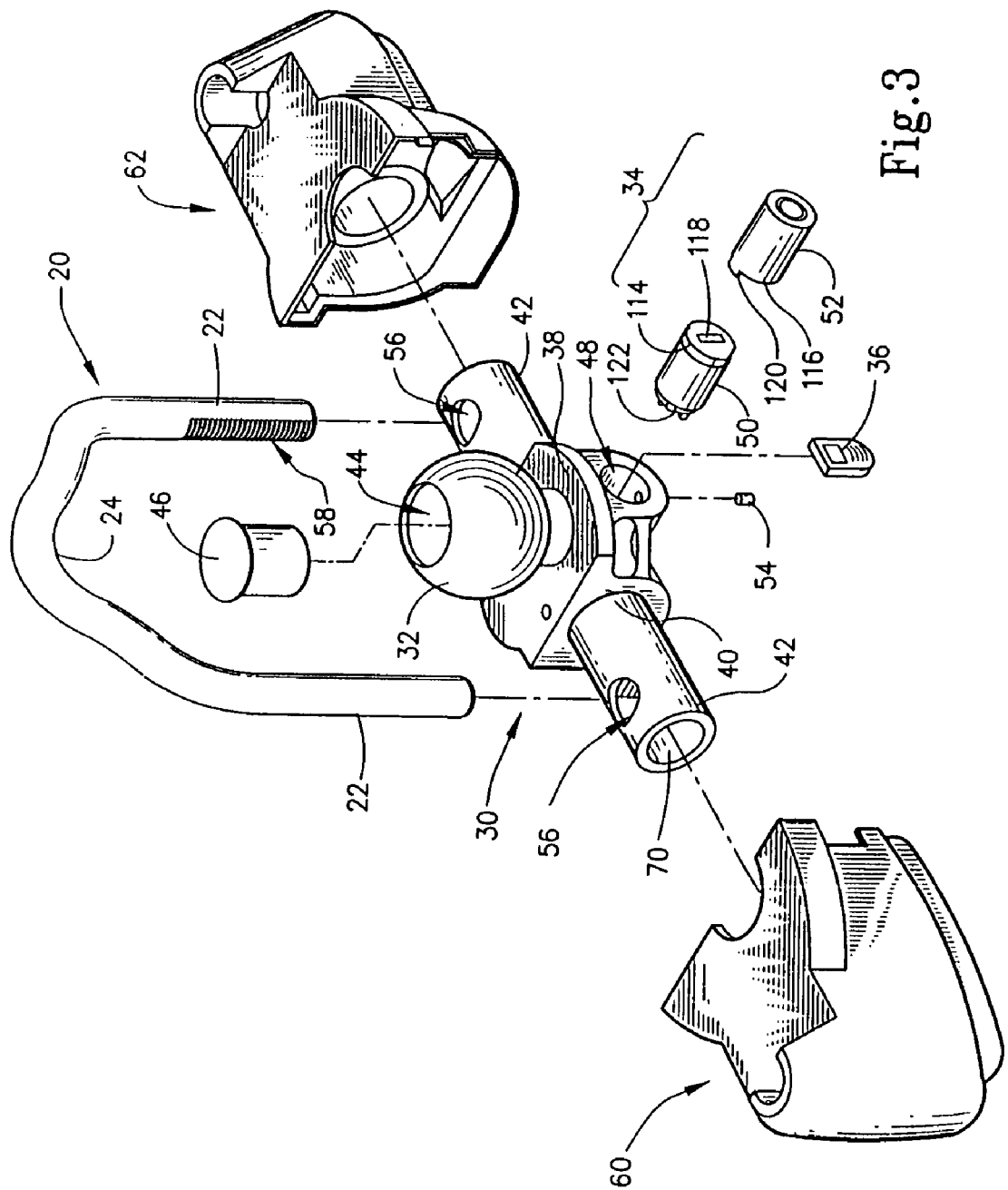
FIG. 3 is an exploded view in perspective of the locking device shown in FIG. 2.

The present invention broadly concerns locks and locking devices adapted to secure an object. The present invention is particularly concerned with a locking device that is adapted to secure to the coupler section of a trailer that has a hitch ball recess so as to prevent attachment of the trailer hitch coupler to a towing vehicle when the locking device is secured thereto. This locking device also permits the securing of the coupler section of the trailer to a stationary object to prevent unauthorized use or theft of the trailer.

With reference now to FIG. 1, locking device 10 is introduced and is shown secured to a coupler section 12 of a trailer (not shown). Coupler section 12 typically forms part of the tongue of a trailer (not shown) and includes a recess 14 (shown in phantom) which is adapted to receive the hitch ball of a towing vehicle. An engagement mechanism 15, as is known, is provided to engage a hitch ball during use but can release to allow removal of the hitch ball. Also illustrated in FIG. 1 is a chain 16 having a plurality of links 18 which secure to locking device 10 so that locking device 10 can be secure to an object (again not shown) to prevent an unauthorized removal or theft of the trailer to which coupler section 12 is affixed.

Locking device 10 is better illustrated in FIG. 2 where is can be seen that locking device 10 includes a generally U-shaped shackle member 20 that has a pair of parallel leg sections 22 and a bridge section 24 that extends between leg sections 22. In FIG. 2, shackle member 20 is shown in a retained state where it is secured to a lock housing 30, the structure of which is described in greater detail below. Lock housing 30 includes a hitch ball element 32 supported thereby with hitch ball element 32 being sized and adapted to be engaged with and disengaged from the hitch ball recess 14 of coupler section 12 of the trailer. As used herein, "hitch ball element" means any shaped structure that is sized and adapted to be received and engaged in the hitch ball recess of the coupler section 12.

With reference to both FIGS. 1 and 2, it may be seen that bridge section 24, when in the retained state, extends across hitch ball element 32 so that coupler section 12 will become nonremoveably trapped between hitch ball element 32 and bridge section 24. A selectably lockable latch assembly is disposed in lock housing 30 and is operative to move between a latch state wherein the shackle member 20 may be latched in the retained state and an unlatched state wherein the shackle member 20 may be moved to a released state. A lock mechanism 34 is also disposed in lock housing 30 in order to operate the latch mechanism. Access to lock mechanism 34 is protected by means of a sliding door 36 that can slide in the direction of arrow (A) so that it may move from an open position (FIG. 2) to a closed position (FIG. 1).

With reference now to FIG. 3, it may be seen that lock housing 30 includes a body portion 38 that mounts a tubular casing 40 extending longitudinally therethrough with tubular casing 40 including oppositely projecting casing sections 42 located exteriorly of body portion 38. Body portion 38 rigidly mounts hitch ball element 32 and, in this embodiment, hitch ball element 32 and body portion 38 are integrally cast with one another. Hitch ball element 32 is shown with a vertical bore 44 that is adapted to receive a plug 46. However, it should be understood that hitch ball element 32 could be formed as a solid piece of material and it may take other shapes other than the generally spherical shape shown in FIG. 3. Body portion 38 also includes a bore 48, and, it should be understood that, in this embodiment, bore 48 hitch ball element 32 and casing 40 are all generally orthogonal, i.e. perpendicular, to one another. Bore 48 includes the lock mechanism 34 which is shown to include a rod cam 50 and a lock member 52 that, when assembled, are secured in bore 48 by means of a retaining pin 54. Body position 35 should be formed of any suitable high strength material such as steel.

As shown still in FIG. 3, leg sections 22 of shackle member 20 are spaced apart and sized to extend through a pair of passageways 56 formed in casing sections 42 and secured therein by the latch assembly which will engage latch structures in the form of a plurality of latch teeth 58 formed on each leg section 22. A pair of cooperating housing cover members 60 and 62 are formed so as to nestably receive lock housing 30 and mount access door 36 therein, as is shown in FIGS. 2 and 3. Cover sections 60 and 62 are smoothly contoured and present a reduced profile when locking device 10 is secured to coupler section 12 so as to increase the integrity of locking device 10 against hammer blows and the like should an unauthorized person seek to remove locking device 10 from coupling section 12.

With reference next to FIGS. 4 and 5, it may be seen that body portion 38 has a longitudinal throughway 64 extending therethrough which is sized for close-fitted, mated engagement with tubular casing 40. Casing 40 may be fastened in body portion 38, for example, by retaining pins 66 tubular casing 40 is in the form of a hollow tubular member constructed, for example, of case hardened steel. Casing 40 includes a central opening 68 that is formed at an axis that is perpendicular to passageways 56 to allow interaction of lock mechanism 34 with the latch mechanism, as described below. A latch core 70 is sized for close fitted telescopic mating with casing 40 and includes a configured chamber 72 which receives the latching structure as described below.

Figures 6, 8:
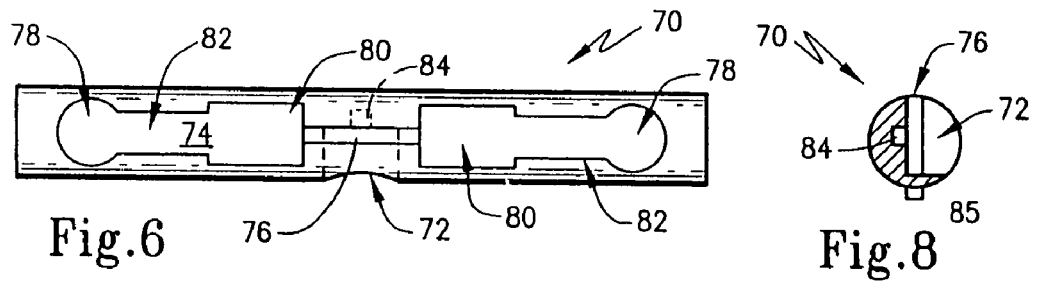
FIG. 6 is a top plan view showing the lock core of FIG. 4.
FIG. 8 is a cross-sectional view taken about lines 8—8 of FIG. 7.
Figures 7, 9:
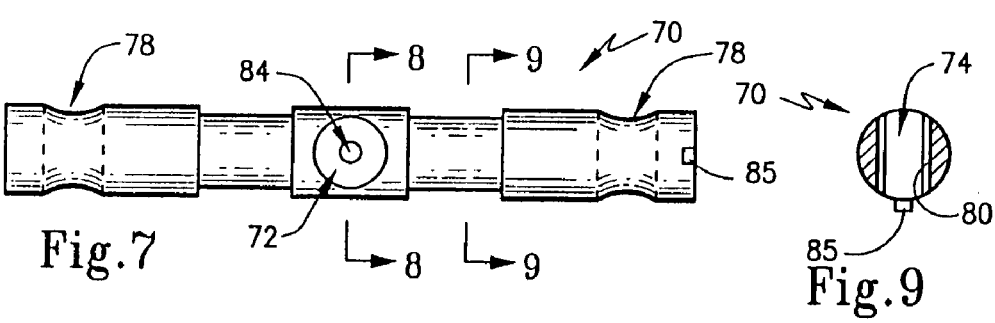
FIG. 7 is a front view in elevation showing the lock core of FIG. 6.
FIG. 9 is a cross-sectional view taken about lines 9—9 of FIG. 7.

The structure of latch core 70 is best shown in FIGS. 6–9 where it may be seen that latch core 70 is molded, for example, out of a durable plastic material. Latch core 70 is symmetric about a plane perpendicular to its longitude so that a pair of chambers 74 are located in latch core 70 and are interconnected by a slotted opening 76. Each of chambers 74 include a bore 78 extending thereto with bore 78 sized and adapted to receive leg sections 22 of shackle member 20. Each of chambers 74 includes a spring chamber section 80 and a latch block chamber section 82. A transverse bore 72 is formed centrally of latch core 70 and has a pilot recess 84 formed coaxially therewith. With reference to FIGS. 8 and 9, it may be seen that bores 78, spring chamber sections 80 and latch block chamber sections 82 extend diametrically through latch core 80 while slotted opening 76 extends the majority of the diametric distance of latch core 70 but not entirely therethrough. One end of latch core 80 is provided with a small tab 85 that extends radially therefrom.

Figures 10, 12:
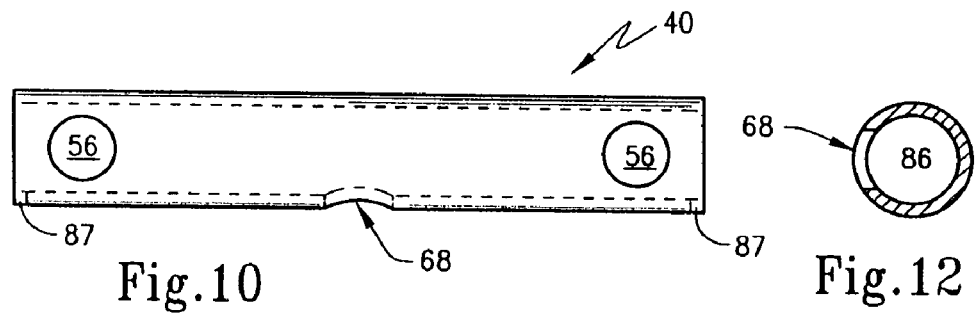
FIG. 10 is a top plan view of the tubular casing used with the lock mechanism illustrated in FIG. 4.
FIG. 12 is a cross-sectional view taken about lines 12—12 of FIG. 11.
Figure 11:
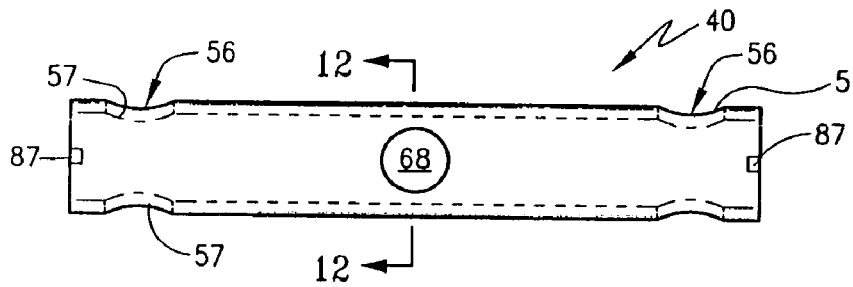
FIG. 11 is a front view in elevation showing the tubular casing of FIG. 10.
Figure 17:
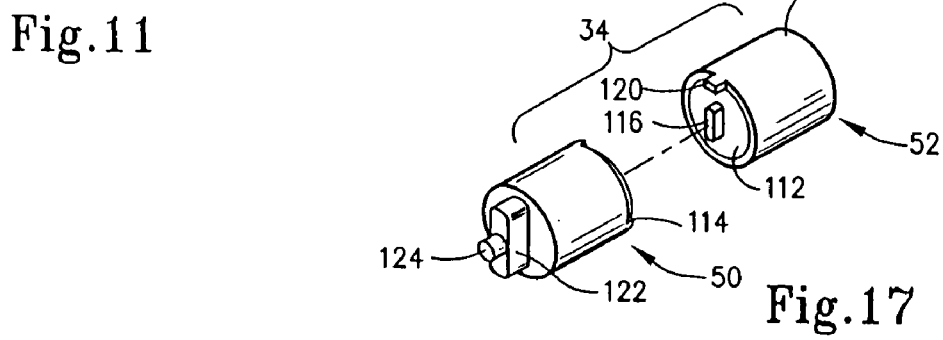
FIG. 17 is a perspective view of a rod can and lock member of the lock mechanism of the present invention.

The structure of tubular casing 40 is best shown in FIGS. 10–12. Here, as noted above, tubular casing 40 has a longitudinally extending interior 86, a central opening 68 and a pair of passageways 56, with each passageway 56 being defined by a pair of opposed openings 57. Openings 57, and thus passageways 56, are sized to receive leg sections 22 of shackle member 20. When latch core 70 is mated with tubular casing 40, bores 78 respectively axially register with passageways 56. Similarly, central opening 68 of casing 40 registers with bore 72 of latch core 70. To facilitate this registration, each end of casing 40 has a small slot 87 formed therein. Tab 85 of latch core 70 will mate with either of these slots 87 to ensure proper registration of the two pieces. By providing a slot 87 at each end of casing 40, latch core 70 may be slid into the interior from either end due to its symmetry.

With reference now to FIG. 13, it may be seen that the latching components of latch mechanism 88 are depicted, with the components of latch mechanism 88 being illustrated in greater detail in FIGS. 14–16. In these figures, it may be seen that latch mechanism 88 includes a pair of latch rods 90 each of which having a shaft portion 92 and a head portion 94 located at a first end of the shaft portion. A latch block 96 is supported at a second end of shaft portion 92. When assembled, a coil spring 98 extends around each shaft portion 92. Latch box 96 are mounted onto latch rod 90 by means of pins 100 shown in FIG. 13.

With reference to FIGS. 6–9 and 13, it should now be understood that latch mechanism 88 is sized and configured for nested insertion into chambers 74 and slotted opening 76 of latch core 70. To this end, when assembled, head portions 94 of latch rods 90 reside in slotted portion 76 with coil springs 98 residing in spring chamber sections 80. Latch blocks 96 are configured for slideable receipt in latch block chamber sections 82 and can move between a first position rod partially in the region defined by bores 78 to a second rod position wherein latch blocks 96 are out of sections 82.

Figure 18:
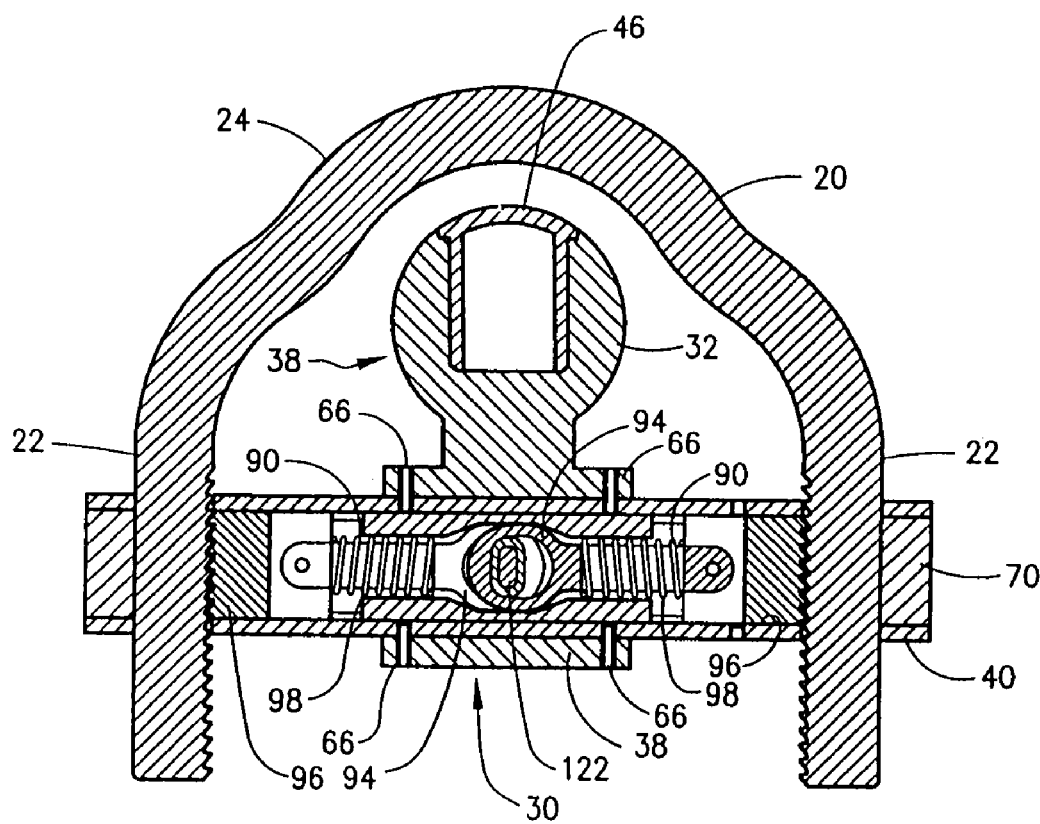
FIG. 18 is a front view in cross-section showing the locking device of the present invention with the shackle member in a retained state that the latch assembly in a latch state with this view not showing the housing cover members.
Figure 19:
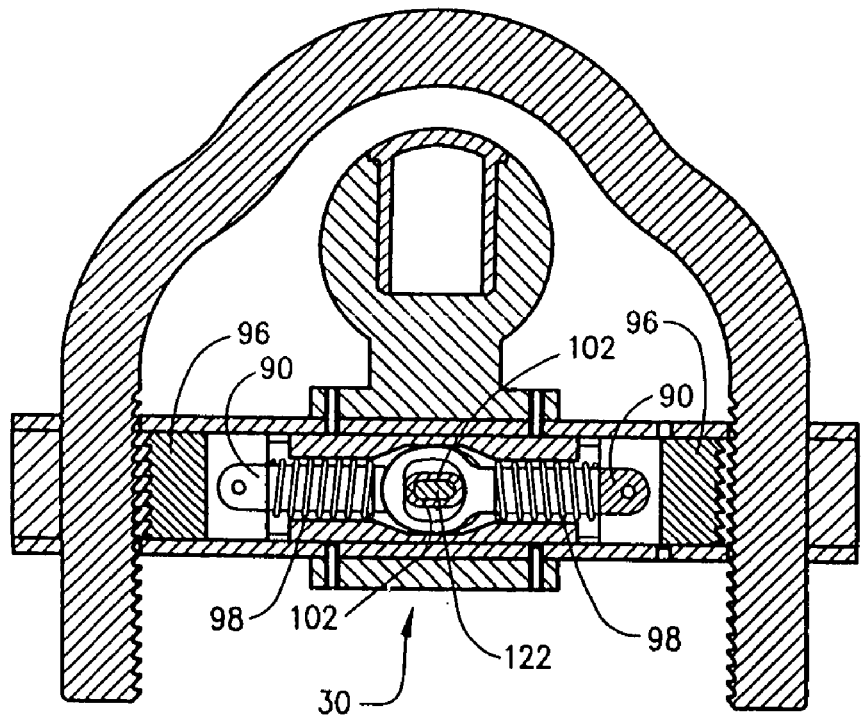
FIG. 19 is a front view in cross-section, similar to FIG. 18, but showing the latch assembly in an unlatch state so that the shackle member may be moved from the retained state to the released state.

The assembly and operation of locking device 10 may now be more fully understood with reference to FIGS. 18 and 19. In FIG. 18, shackle member 20 is shown secured to the lock housing to define a retained state. In this position, cam 122 has a longer dimension that extends vertically so that latch rods 90 may be biased outwardly to the first rod position by means of springs 98 acting against latch blocks 96. Accordingly, latch blocks 96 are biased and are shown in the latch state. In this state, the latch teeth 108 on each latch block 96 selectively engage selected ones of latch teeth 58 to retain shackle member in the retained state. Due to the biasing of latch blocks 96 against the restoring force of springs 98, it should be understood that the latch mechanism defines a ratchet engagement so that, even when the latch mechanism is in the latch state, leg sections 22 of shackle member 20 may be inserted therein and engage latch blocks 96 in a ratchet like manner permitting adjustment of shackle member 20 so that bridge section 24 may trap coupler section 12 between hitch ball element 32 and bridge section 24.

FIG. 19 shows the locking device 10 wherein the latch assembly is moved to the unlatch state so that shackle member 20 may moved from the retain state to the release state. Here, it may be seen that cam member 122 has been rotated 90 degrees so that it acts against cam surfaces 102 of openings 104 and draws latch rods 90 toward one another against the force of springs 98. This occurs when a key is inserted into lock member 52 and lock core 112 is rotated with respect to casing 110. When latch rods 90 are drawn towards one another, latch blocks 96 are drawn toward one another to disengage latch teeth 108 from latch teeth 58. In this position, of course, shackle member 20 may now be withdrawn or removed from lock housing 30 and released therefrom.

From the foregoing, it should be appreciated that the locking device 10 is assembled by affixing tubular casing 40 in body portion 38 by means of pins 66. Latch mechanism 88 that includes a pair of latch rods, a pair of latch blocks and a pair of springs 98 are then mounted in chambers 74 and slotted opening 76 with openings 104 registering with bore 72. Lock core 70 with latch mechanism 78 mounted therein is then inserted into casing 42 that extends throughway 64. Lock mechanism 34 may then be inserted into bore 48 by first inserting rod cam 50 so that cam 122 resides in openings 104 with pilot post in pilot recess 84. Lock member 50 is then inserted so that post 116 engages cavity 118 and the lock core is pinned into position by means of retaining pin 54. Cover sections 62 are then mounted over the lock housing and secured thereto in any convenient manner. At this time, door 36 is also placed into position to slide so as to selectively conceal or reveal lock mechanism 34.

From the foregoing, it may also be appreciated that the present invention contemplates a method that may be accomplished by the steps inherent in the described structure. Generally, this method includes engaging a hitch ball recess of a coupler section of the trailer by means of a hitch ball element. The method includes the stop of spanning a portion of the coupler section adjacent to the hitch ball element with a shackle member in a manner such that a first portion of the coupler member is located between the shackle member and the hitch ball element and then adjusting the shackle member relative to the hitch ball element so as to nonremoveably trap the first portion of the coupler member between the hitch ball element and the shackle member to define a locked state. The method then includes lockably retaining a second portion of the shackle member relative to the hitch ball element so that the first portion of the shackle member is locked in the lock state. This method may also include the step of selectively releasing the second portion of the shackle member so that the first portion of the shackle member is unlocked and removable, thereby permitting disengagement of the first portion of the coupler section. The method can also accomplish the step of adjusting by means of a ratcheting action wherein a latch mechanism is resiliently biased into ratcheting engagement with a second portion of the shackle member.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. A locking device adapted to secure to a coupler section of a trailer, comprising:
   (A) a lock housing including a hitch ball element supported thereby that is sized and adapted to mate with a coupler section of a trailer, said lock housing having a pair of spaced-apart passageways extending therethrough;
   (B) a shackle member releasably securable to said lock housing to define a retain state, said shackle member including a pair of spaced-apart leg sections and a bridge section extending therebetween, wherein each of said leg sections has a latch structure thereon and is respectively configured to pass through the pair of passageways when in the retain state whereby said coupler section can be non-removably engaged between said hitch ball element and said bridge section, said shackle member releasable from said lock housing to define a release state wherein said coupler section can be engaged by and released from said hitch ball element;
   (C) a latch mechanism disposed in said lock housing and operative to move between a latch state wherein said latch structure is engaged thereby retaining said shackle member in the retain state and an unlatch state wherein said latch structure is disengaged such that said shackle member may be moved to the release state; and
   (D) a lock mechanism that is integral with the lock housing and that is movable between a lock state to lock said latch mechanism in the latch state such that said shackle member is in the retain state and an unlock state to unlock said latch mechanism so that it may move to the unlatch state thereby allowing said shackle member to move to the release state.

2. A locking device according to claim 1 wherein said latch structures are each defined by a plurality of first latch teeth, said latch mechanism including a pair of latch blocks each having at least one second latch tooth operative to engage a selected one of said first latch teeth when in the retain state.

3. A locking device adapted to secure to a coupler section of a trailer, comprising:
   (A) a lock housing including a hitch ball element supported thereby that is sized and adapted to mate with a coupler section of a trailer, said lock housing having a pair of spaced-apart passageways extending therethrough;
   (B) a shackle member releasably securable to said lock housing to define a retain state, said shackle member including a pair of spaced-apart leg sections and a bridge section extending therebetween, said leg sections respectively configured to pass through the pair of passageways when in the retain state whereby said coupler section can be non-removably engaged between said hitch ball element and said bridge section, said shackle member releasable from said lock housing to define a release state wherein said coupler section can be engaged by and released from said hitch ball element;
   (C) a latch mechanism disposed in said lock housing including a pair of latch rods each having a cam surface associated therewith and operative to move between a first rod position corresponding to a latch state wherein said shackle member is latched in the retain state and a second rod position corresponding to an unlatch state wherein said shackle member may be moved to the release state; and
   (D) a lock mechanism that is integral with the lock housing, rotatable between first and second rotational positions that respectively correspond to a lock and an unlock state, and that includes a cam element that interacts with the cam surfaces such that rotation of said lock mechanism between the first and second rotational positions acts to cause movement of said latch rods between the first and second rod positions.

4. A locking device according to claim 3 wherein each said latch rod includes a shaft portion and a head portion located at a first end of said shaft portion, said latch mechanism including a latch block located at a second end of each said shaft portion opposite the first end portion thereof, said head portion having the cam surface formed therein, and including a spring positioned along each said shaft portion that is operative to bias the respective said latch rod toward the first position.

5. A locking device adapted to secure to a coupler section of a trailer that has a hitch ball recess, comprising:
   (A) a lock housing including a hitch ball element supported thereby that is sized and adapted to be engaged with and disengaged from the hitch ball recess of a coupler section of a trailer, wherein said lock housing includes a body portion having a longitudinal throughway extending therethrough and a transverse bore intersecting the throughway with said hitch ball oriented generally orthogonally to the throughway and to the bore, and including an elongated tubular casing disposed in the throughway;
   (B) a shackle member releasably securable to said lock housing to define a retain state, said shackle member including a bridge section that extends across said hitch ball element when in the retain state whereby said coupler section becomes non-removably trapped between said hitch ball element and said bridge section when in the retain state, said shackle member releasable from said lock housing to define a release state wherein said coupler section can be released from said hitch ball element; and
   (C) a selectively lockable latch assembly disposed in and integral with said lock housing and operative to move between a latch state wherein said shackle member is latched in the retain state and an unlatch state wherein said shackle member may be moved to the release state.

6. A locking device according to claim 5 wherein said latch assembly includes a latch mechanism and a lock mechanism mechanically linked to one another, said latch mechanism disposed in said casing and said lock mechanism disposed in the bore.

7. A locking device according to claim 5 wherein said shackle member includes at least one leg section supporting said bridge section and having a latch structure thereon, said casing including an exposed portion that projects exteriorly of said body portion and having a passageway formed therein sized to receive said leg section when in the retain state, said latch assembly operative to engage said latch structure when in the latch state to prevent removal of said leg section from said casing.

8. A locking device adapted to secure to a coupler section of a trailer, comprising:
   (A) a lock housing including
      (1) a body portion having a longitudinal throughway extending therethrough and a bore intersecting the throughway, (2) an elongated tubular casing disposed in the throughway and including oppositely projecting casing sections located exteriorly of said body portion, each of said casing sections having a spaced-apart passageway extending therethrough, and (3) a hitch ball element supported by said body portion and sized and adapted to mate with a coupler section of a trailer, said hitch ball element ball oriented generally orthogonally to the throughway;

(B) a shackle member releasably securable in said casing to define a retain state, said shackle member including (1) a pair of spaced-apart leg sections each having a first latch structure thereon and (2) a bridge section extending between said leg sections, (3) said leg sections respectively configured such that a respective leg section will pass through a respective passageway when in the retain state whereby said coupler section can be non-removably engaged between said hitch ball element and said bridge section, said shackle member releasable from said casing to define a release state wherein said coupler section can be engaged by and released from said hitch ball element;

(C) a latch mechanism disposed in said casing and operative to move between a latch state wherein said shackle member is latched in the retain state and an unlatch state wherein said shackle member may be moved to the release state; and (D) a lock mechanism disposed in the bore and mechanically linked to said latch mechanism, said lock mechanism movable between a lock state to lock said latch mechanism in the latch state such that said shackle member is in the retain state and an unlock state to unlock said latch mechanism so that it may move to the unlatch state thereby allowing said shackle member to move to the release state.

9. A locking device according to claim 8 wherein said latch mechanism includes a latch core disposed within said casing and a pair of latch blocks received in and guided by said latch core, each said latch block having a second latch structure thereon operative to cooperate with a respective said first latch structure to latch said shackle member in the retain state.

10. A locking device according to claim 9 wherein said latch blocks are biased into the latch state.

11. A locking device according to claim 9 wherein said latch mechanism includes a pair of latch rods each having a shaft portion and a head portion located at a first end of said shaft portion and supporting a respective one of said latch blocks on a second end of said shaft portion, said latch rods received in and guided by said latch core.

12. A locking device according to claim 11 wherein each said first latch structure is defined by a plurality of first latch teeth and wherein each of said second latch structures is defined by at least one second latch tooth.

13. A locking device according to claim 12 including a spring element associated with each said latch rod that is operative to bias a respective latch block into the latch state such that said first latch teeth and said second latch tooth define a ratchet engagement whereby said leg sections may be inserted into but not removed from said casing when said latch mechanism is in the latch state.

14. A locking device according to claim 11 wherein each of said latch rods has a cam surface associated therewith and is movable between first and second rod positions that respectively correspond to the latch and unlatch states, said lock mechanism being rotatable in the bore between first and second rotational positions, said lock mechanism including a cam element that interacts with the cam surface such that rotation of said lock mechanism between the first and second rotational positions acts to cause movement of said latch rods between the first and second rod positions.

15. A locking device according to claim 14 wherein each of the cam surfaces is formed by a lop-sided opening in said head portion of a respective latch rod and wherein said cam element is formed as a post having a length that projects through the openings, said cam element having a width and a thickness that are different from one another.

16. A locking device according to claim 8 wherein said lock mechanism includes a lock casing, a rotatable lock core that is rotatable in the lock casing between first and second rotational positions, and a rod cam that is mechanically linked to said lock core whereby rotation of said lock core acts to rotate said rod cam.

17. A locking device according to claim 16 wherein at least one of said lock casing and said rod cam includes a limit stop structure to restrict rotation of said rod cam such that said rod cam can rotate between but not past said first and second rotational positions.

18. A locking device according to claim 8 including a pair of cooperating housing cover members constructed to receive and mount said lock housing therein.

* * * * *